UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

REDUCTION OF ORES.

1,031,490.

Specification of Letters Patent.

Patented July 2, 1912.

No Drawing.

Application filed May 5, 1911. Serial No. 825,185.

*To all whom it may concern:*

Be it known that I, ELIHU THOMSON, a citizen of the United States, residing at Swampscott, in the county of Essex, State of Massachusetts, have invented certain new and useful Improvements in Reduction of Ores, of which the following is a specification.

My invention relates to the metallurgy of iron and steel and comprises a process of reducing ores, such as iron oxid to the metallic state while conserving the by-products of the reduction in a state best suited for their utilization.
Another object of my invention is to produce steel direct from iron ore.

In the common blast furnace process, in accordance with which iron oxid and carbon are maintained at the reduction temperature by means of the oxidation of carbon with air, the carbon monoxid resulting from the reaction is greatly diluted with nitrogen and is, therefore, rendered less valuable than the undiluted gas.
In accordance with my invention, the reduction process is carried out in two stages: first, a bath of melted iron is blown with an oxidizing gas as air to obtain a highly heated, chemically active bath consisting very largely or entirely of iron oxid; second, into this chemically active bath are charged iron ore and carbon, the latter under certain conditions being in excess of the amount required to reduce the iron oxid to the metallic state. By this process the nitrogen escaping unused from the bath during the first stage of the process is available as a by-product for utilization in the manufacture of cyanamid or other nitrogen products. The substantially undiluted carbon monoxid resulting from the oxidation of the carbon in the second stage of the process is available for power, heat or other uses.

When carrying out my invention a molten mass of iron produced in any well-known way is placed into an apparatus, such as a Bessemer converter, which is provided with appropriate means for introducing a blast of gas. The converter is provided with a suitable refractory lining which will naturally be basic to avoid corrosion by iron oxid—or the vessel may be suitably jacketed or lined. This molten iron mass is then oxidized by a blast of air, thereby converting it to a large extent to the ferroso-ferric oxid or magnetite. This oxidation will raise the temperature of the mass to a high degree, and maintain it molten, the final temperature depending upon the fact whether ordinary air or enriched air, that is, air which contains more than a normal amount of oxygen, has been used for the oxidizing blast. The temperature limit when the iron is blown with ordinary air is that temperature at which the heat is carried off as fast as produced, by the unused nitrogen. When enriched air or oxygen is used the temperature limit will, of course, be much higher. When using either ordinary or enriched air during this stage of the process the unused nitrogen is carried away by means of appropriate conveyers, its heat being utilized, if desired, to preheat the raw materials which are fed into the oxid baths during the next stage of the process.

At the end of the first stage of the process the fused mass of iron oxid at an exceedingly high temperature is obtained, and such a fused mass is very chemically active. Into this fused mass a mixture of preheated dry iron ore and carbon is charged. At the high temperature the carbon reacts at once with the oxid of iron reducing it and yielding substantially pure carbon monoxid unmixed with nitrogen. It will, of course, be understood that appropriate slagging agents are added with the iron ore, for example, if the ore is silicious or contains clay, it is naturally to be mixed with limestone to flux the same though much less lime will be needed than is ordinarily the case on account of the high temperature. When limestone is used as a fluxing agent it will, of course, be advisable to add a corresponding amount of carbon in order to convert the carbon dioxid given off by the decomposition of the limestone to carbon monoxid. If desired, carbon, in excess of the amount required for the above reactions, may be charged during this stage of the process, the air blast being continued to some extent in order to add heat by the oxidation of the carbon, but, when the process is carried out on a large scale, less of this will ordinarily be necessary. The products of this stage of the process will be a melted bath of metallic iron and carbon monoxid gas in a pure or nearly pure state, the latter being well suited for utilization in gas engines, for heating or other purposes. If it is desired that the iron so produced should contain carbon, the amount of carbon added, of course, is so regulated that an excess will be available after the reduction process is complete.

The high temperature at which the reduction of the iron oxid is carried out will enable the resulting iron or steel to be treated by appropriate chemically active admixtures or slagging agents under advantageous conditions such as obtained in an electric furnace. The purity of the carbonic oxid gas formed by the reaction of the carbon with the oxygen of the ore and with the oxidized metal of the bath will, of course, depend upon the fact whether or not any blast is continued during the final stage of the process. In case a blast of ordinary air or enriched air has been kept up, it will, of course, be mixed with some nitrogen. In either case it will, however, be of far greater purity than the waste furnace gases now available from the blast furnace process. As the escaping carbon monoxid gas will be highly heated, its high temperature is utilized to preheat and thoroughly dry the mixture of ore and limestone which is charged into the reactive oxid bath during the second stage of the process. As at the end of the second stage of the process, an amount of iron or steel has been added to the original bath of melted metal by the reduction of iron ore, a quantity is drawn off, leaving a melted residue for a repetition of the first stage of the process. The slag floating upon the bath of iron should also be removed from time to time. The slag is very hot and can be treated to obtain almost any chemical composition while still liquid, and therefore can be utilized in the manufacture of Portland cement.

What I claim as new, and desire to secure by Letters Patent of the United States, is:—

1. The process which consists in blowing molten iron with an oxidizing gas to form a bath consisting largely of iron oxid, charging ore and carbon into said bath while at a high temperature and conducting away the resulting carbon monoxid.

2. The process which consists in blowing molten iron with an oxidizing gas to form a bath consisting in large part of iron oxid, charging ore and carbon into said bath while at a high temperature whereby the reduction of iron oxid and the oxidation of carbon is effected and conducting away the resulting carbon monoxid gas.

3. The process which consists in blowing a molten mass of iron with air, conducting away the surplus gas residue rich in nitrogen, charging ore and carbon into the resulting oxidized bath while at a high temperature whereby a reduction of iron oxid and the oxidation of carbon is effected and conducting away the products of said reaction.

4. The process of producing metallic iron which consists in oxidizing by means of a blast rich in oxygen a mass of molten iron to produce a very highly heated, chemically active bath of iron oxid, charging iron ore and carbon into said bath, the carbon being in an amount sufficient to reduce the combined quantity of oxid of iron to metallic iron, withdrawing a portion of the resulting metallic iron, and repeating the cycle with the remaining portion.

5. The process which consists in oxidizing a molten mass of iron to produce a very highly heated chemically active bath of molten oxid of iron, charging into said bath iron ore and a reducing agent whereby reduction of the oxids of iron is secured, withdrawing the resulting surplus of metallic iron and treating the same while still at a high temperature with appropriate chemical admixtures to produce steel of desired quality.

6. The process of producing metallic iron which consists in oxidizing metallic iron to produce a highly heated bath of molten iron oxid, charging preheated iron ore and carbon into said bath, thereby producing an amount of metallic iron, in excess of the original amount.

In witness whereof, I have hereunto set my hand this third day of May, 1911.

ELIHU THOMSON.

Witnesses:
JOHN A. MCMANUS, Jr.,
CHARLES A. BARNARD.

---

Copies of this patent may be obtained for five cents each, by addressing the "Commissioner of Patents, Washington, D. C."